Oct. 1, 1946.    W. HAMILTON    2,408,636
PICKER STICK CHECKING MECHANISM
Original Filed May 13, 1944    2 Sheets-Sheet 1

INVENTOR.
WALLACE HAMILTON
BY Claude F. Snider
ATTORNEY

Oct. 1, 1946.　　　W. HAMILTON　　　2,408,636
PICKER STICK CHECKING MECHANISM
Original Filed May 13, 1944　　2 Sheets-Sheet 2

INVENTOR.
WALLACE HAMILTON
BY Claude F. Snider
ATTORNEY

Patented Oct. 1, 1946

2,408,636

UNITED STATES PATENT OFFICE 2,408,636

PICKER STICK CHECKING MECHANISM

Wallace Hamilton, Albany, N. Y., assignor to Draper Corporation, Hopedale, Mass., a corporation of Maine Refiled for abandoned application Serial No. 535,420, May 13, 1944. This application May 31, 1945, Serial No. 596,832

6 Claims. (Cl. 139—165)

The present invention relates generally to picking mechanisms for fly shuttle looms and, as illustrated herein, relates more particularly to picker stick checking mechanisms.

This application is re-filed for applicant's abandoned application, Serial No. 535,420, filed May 13, 1944.

Prior picker stick checking mechanisms generally included a single relatively wide looped check strap which passes between spaced offset friction fingers which are effective to retard the strap when the strap is moved by the picker stick as the picker stick approaches the limit of its oscillation. The picker stick moves at a high rate of speed and thus when it engages the single wide loop of prior constructions an excessive braking or retarding force is applied to the picker stick. This is objectionable since it produces excessive wear on the parts and in some instances results in breaking of the picker stick.

Furthermore, the sudden strain imposed on the check strap results ultimately in so weakening the strap that it may break. It is necessary, therefore, to provide a relatively heavy and consequently expensive strap to provide a strap which will last for a reasonably long period of use without breaking.

One object of the present invention is to provide a check by the use of which the above objections will be overcome. To this end and in accordance with one feature of the invention, a check strap has been provided which is secured beneath the lay and which provides a plurality of helically wound loops which are successively engaged by the picker stick thus progressively applying a gradually increasing retarding force to the picker stick. Such a construction avoids the necessity for using an excessively thick strap and thus reduces the cost thereof. The illustrated strap is relatively long and narrow and comprises a plurality of loops about the picker stick, the ends of the strap being anchored on opposite sides of the picker stick. By the use of a plurality of loops, substantially equal force is applied to each side of the picker stick and thus causes the picker stick to travel in the center of the slot in the lay as the picker is being checked.

With the above and other objects and features in view, the invention will now be described with particular reference to the accompanying drawings which illustrate a preferred embodiment thereof and in which.

Figure 1:
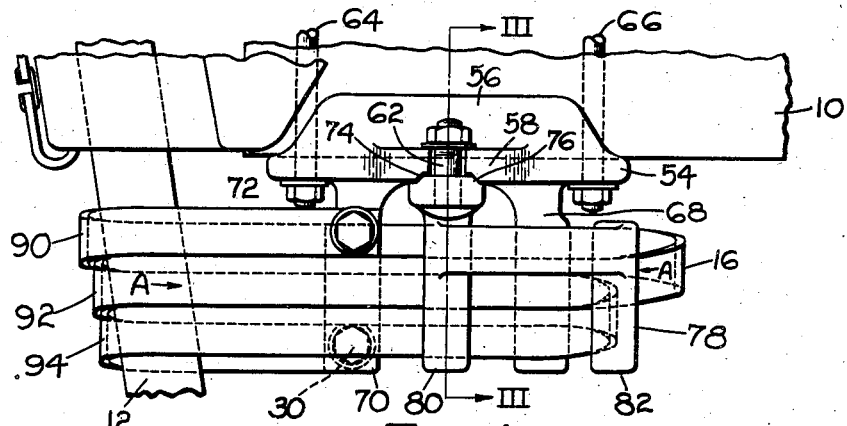
Fig. 1 is a view in front elevation of the left hand end of a lay having a preferred embodiment of the invention applied thereto showing the position of the parts when a shuttle is in the box.

The drawings show only a part of a loom to which the present invention may be applied. The parts of the loom, which are neither shown nor described, are of usual construction and they form no part of the present invention. The drawings show a portion of the left hand end of the usual lay beam 10 and a picker stick 12. The usual shuttle box and shuttle are not shown since the construction and operation of these parts is not necessary to a full understanding of the present invention. The picker stick 12 is swung back and forth in the usual manner in a slot 14 formed in the lay 10.

The friction devices for supporting and checking the movement of a check strap 16 are mounted on opposite sides of the lay 10. The friction devices include a bracket 18 having a portion 20 under the lay and fitting against the bottom thereof and an upwardly extending flange 22 fitting against the rear side of the lay. The bracket 18 is secured to the lay 10 by bolts 24 extending through slots (not shown) in the portion 20. The portion 20 of the bracket 18 is provided with a depending friction finger 26 which is provided with a rounded surface arranged to engage the inner surface of the check strap 16. The portion 20 is also provided with a second depending member 28 to the lower end portion of which one end of the check strap 16 is secured by means of a cap screw 30. The flange 22 is provided with a rearwardly extending ledge 32 having a rearwardly extending slot 34 therein.

The ledge 32 in its bottom face is provided with a forwardly and rearwardly extending groove 36 which forms a way for a rib 38 formed on the upper surface of a bracket 40. The bracket 40 is provided with a pair of depending friction fingers 42, 44 which engage the outer face of the check strap 16 and between which the friction finger 26 is located. The bracket 40 is arranged to be adjusted forwardly and rearwardly of the lay 10 to increase or decrease the sinuous course of the check strap between the three friction fingers 26, 42 and 44. The bracket 40 is provided with a slot 46 which is aligned with the slot 34 in the ledge 32. A bolt 48 passes through both slots and permits adjustment of the bracket 40. A lock nut 50 locks the parts in adjusted position.

The front side of the lay 10 is also provided with a similar strap supporting and checking mechanism and includes a bracket 52, having a portion 54 extending beneath and fitting against the bottom of the lay and an upwardly extending flange 56 fitting against the front side of the lay. The bracket 52 is provided with a forwardly extending shelf or ledge 58 having a slot 60 therein for receiving a clamping bolt 62. The bracket 52 is securely bolted to the lay 10 by suitable bolts 64, 66.

The bracket 52 is provided with a depending friction finger 68 having a rounded portion for engaging the inner surface of the check strap 16. The bracket 52 is also provided with a second depending member or finger 70 to the upper end portion of which the other end of the check strap 16 is secured by a cap screw 72.

The lower surface of the bracket 52 is provided with a groove 74 which acts as a way for an upstanding rib 76 formed on the upper surface of a bracket 78. The bracket 78 is provided with a pair of depending friction fingers 80, 82 which are disposed at either side of the finger 68 and are each provided with a rounded surface arranged to engage the outer surface of the strap 16. The bracket 78 is adjustable forwardly and rearwardly of the lay to change the location of the fingers 80, 82 and thus increase or decrease the sinuous course of the check strap 16.

Figure 2:
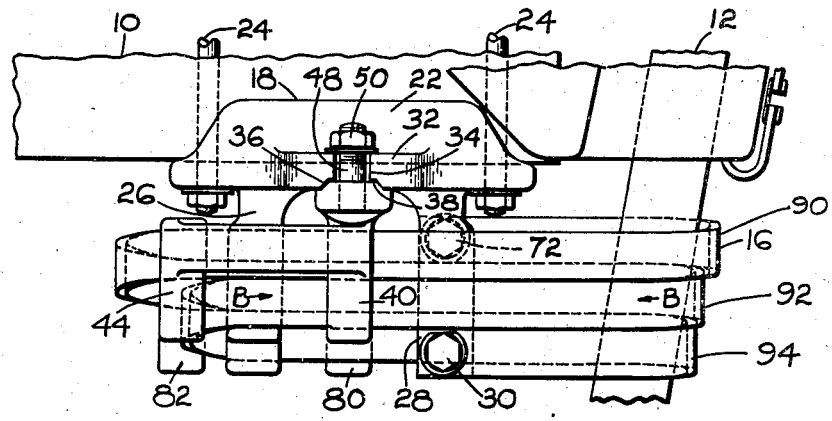
Fig. 2 is a view in rear elevation of the construction shown in Fig. 1.
Figure 3:
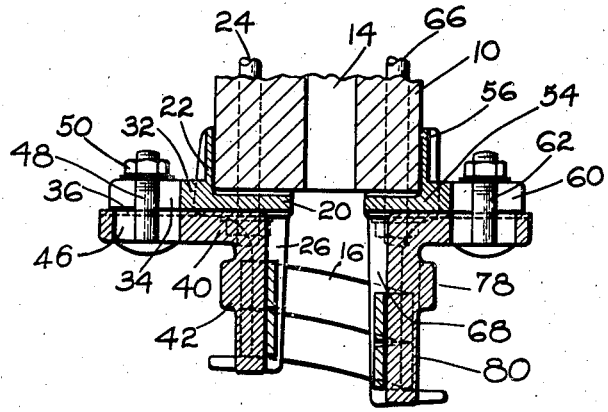
Fig. 3 is a sectional view taken along the line III—III of Fig. 1.

The check strap 16, as previously stated, is secured at one end to the finger 70 of the bracket 52 by the cap screw 72. The strap then is passed rearwardly behind the finger 28, forwardly of the fingers 42, 44 and rearwardly of the finger 26. The strap then passes forwardly behind the fingers 82, 80 and in front of the fingers 68, 70. This portion of the strap is marked A—A in Figs. 1 and 4 of the drawings. The strap then passes rearwardly behind the finger 28, forwardly of the fingers 42, 44 and rearwardly of the finger 26. This portion of the strap is marked B—B in Fig. 2 of the drawings. The strap then passes forwardly behind the fingers 82, 84 and in front of the fingers 68, 70. The strap then passes rearwardly and the end portion is secured to the lower portion of the finger 28 by the cap screw 30. Thus, the check strap 16 is wound helically between the friction fingers and about the picker stick 12.

Figure 4:
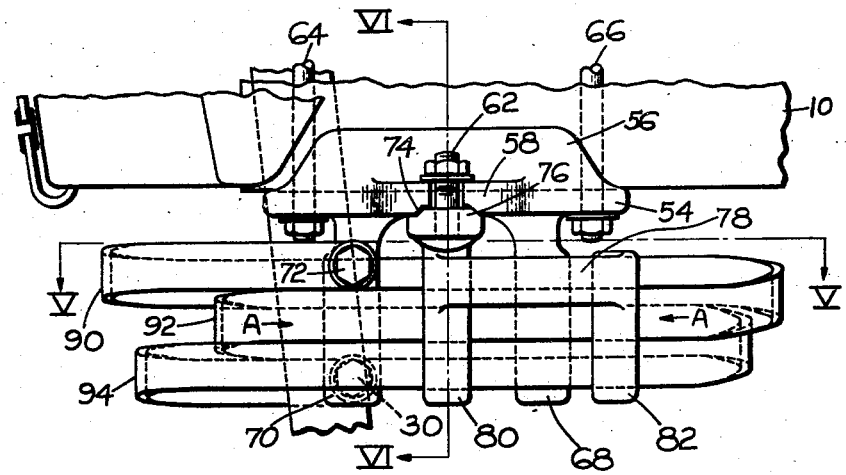
Fig. 4 is a view similar to Fig. 1 but showing position of the parts as the picker stick is returning to the position shown in Figs. 1 and 2.
Figure 5:
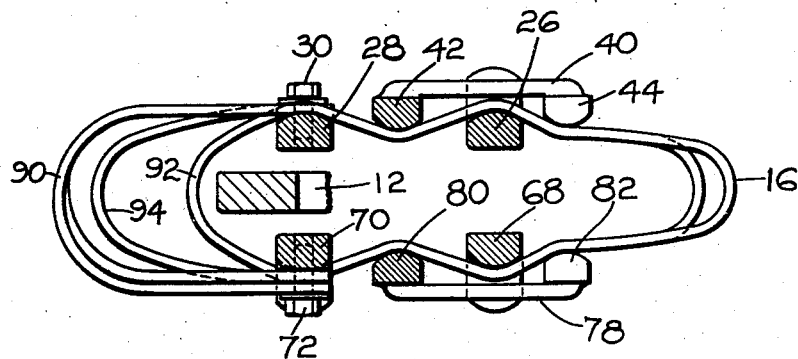
Fig. 5 is a view in section taken along the line V—V of Fig. 4.
Figure 6:
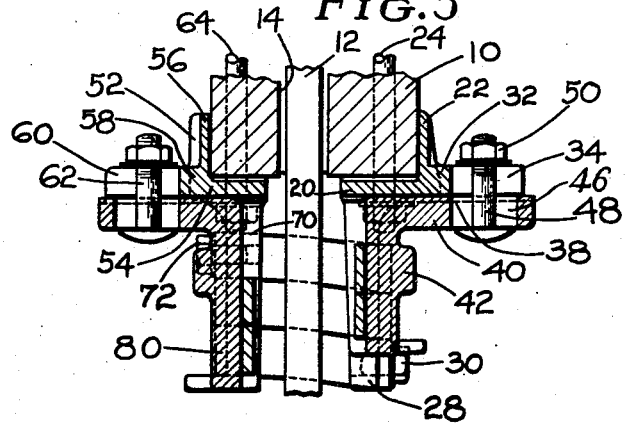
Fig. 6 is a section taken along the line VI—VI of Fig. 4.

It is desirable progressively to increase the checking action of the check strap 16 and the strap is designed to produce this result. Referring now to Fig. 4, it will be noted that the upper loop 90 of the check strap 16 is located near the outer end of the lay. The loop 92 is located nearer the picker stick while the lower loop 94 occupies an intermediate position. Thus when the picker stick 12 is moved outwardly by engagement with an incoming shuttle, the picker stick will successively engage the loops 92, 94 and 90, thus increasing the retarding effect of the strap as the picker stick approaches the outer limit of its movement. To insure that the loop 92 will be engaged first, the portions of the friction fingers engaging the portions A—A and B—B are slightly relieved so that the friction on these portions of the strap are slightly less than on the other portions of the strap. Thus when the strap is moved when the picker stick approaches the inner limit of its movement, the resistance of the loop 92 will be somewhat less and hence it is moved more easily. The resistance of the loops 90 and 94 is substantially greater and hence these loops will be moved inwardly a somewhat lesser distance.

The upper and lower loops 90 and 94, respectively, are effective to maintain the picker stick 12 centered in the slot 14. The upper loop 90 tends to pull the stick toward the rear while the lower loop tends to pull the stick forwardly. Since the intermediate loop 92 moves bodily outwardly and hence imparts no turning movement to the picker stick, the opposed forces will offset or equalize each other and the picker stick will remain centered in the slot 14 in the lay. The present construction, therefore, presents the advantages of a circular check strap without the necessity of dismantling the picker stick and parallel shoe when it is desired to replace a broken check.

Having thus described a preferred embodiment of my invention, what I claim as new and desire to secure by Letters Patent of the United States is:

1. A check for a picker stick including front and rear brackets fixed to a lay and having depending friction fingers, and a flexible strap fixed at each end to said brackets and helically threaded between said fingers to form a plurality of loops arranged to be progressively engaged by the picker stick as it approaches each limit of movement to check said stick.

2. A check for a picker stick including front and rear brackets fixed to a lay, depending friction fingers on each of said brackets, and a flexible strap fixed at one end to said front bracket and at its other end to said rear bracket and helically threaded between said fingers on said front and rear brackets to form a plurality of integral helical loops about said picker stick to progressively check movement of said picker stick as it approaches each limit of its movement.

3. A check for a picker stick including front and rear brackets fixed to a lay, depending friction fingers on each of said brackets, and a flexible strap fixed at each end to said brackets and threaded between said fingers helically in successive vertical loops in edge-to-edge relationship, said loops being arranged to be progressively engaged by the picker stick to check said picker stick as it approaches either limit of its movement.

4. A picker stick check of the type including front and rear brackets fixed to a lay, depending friction fingers on each of said brackets, said fingers being relieved slightly adjacent to their mid portions, and a long narrow flexible strap fixed at one end to said front bracket and at its other end to said rear bracket and helically threaded between said fingers to form a plurality of loops arranged to be progressively engaged by the picker stick as it approaches either limit of its movement.

5. A picker stick check of the type including front and rear brackets fixed to the bottom of a lay on opposite sides of the picker stick slot, stationary and adjustable depending friction fingers on each of said brackets and a long narrow flexible strap fixed at one end to said front bracket and at its other end to said rear bracket, said strap being helically threaded between said fingers to form a plurality of loops of different length arranged to be engaged progressively by the picker stick as it approaches either limit of its movement to check said stick, said fingers being arranged to offer less frictional resistance to movement of one of said loops than to movement of other of said loops, for the purpose described.

6. A picker stick check of the type including front and rear brackets fixed to the bottom of a lay on opposite sides of a picker stick slot therein, stationary and adjustable depending friction fingers on each of said brackets, said fingers having slightly relieved portions, and a flexible strap fixed at one end to said front bracket and at its other end to said rear bracket, said strap being helically threaded between said fingers to provide a plurality of loops each of different length and said relieved portions providing different resistance to movement of different of said loops by said picker stick whereby increasingly greater resistance will be applied to said picker stick as it reaches either limit of its movement.

WALLACE HAMILTON.